(12) United States Patent
Refke et al.

(10) Patent No.: US 8,084,100 B2
(45) Date of Patent: Dec. 27, 2011

(54) METHOD FOR THE MANUFACTURE OF A COATING

(75) Inventors: Arno Refke, Mellingen (CH); Wolfram Beele, Ratingen (DE)

(73) Assignee: Sulzer Metco AG, Wohlen (CH)

( * ) Notice: Subject to any disclaimer, the term of this patent is extended or adjusted under 35 U.S.C. 154(b) by 0 days.

(21) Appl. No.: 11/799,284

(22) Filed: Apr. 30, 2007

(65) Prior Publication Data
US 2007/0259173 A1    Nov. 8, 2007

(30) Foreign Application Priority Data
May 5, 2006    (EP) .................................... 06405192

(51) Int. Cl.
C23C 4/02      (2006.01)
C23C 4/10      (2006.01)
C23C 4/12      (2006.01)
C23C 14/08     (2006.01)
C23C 8/10      (2006.01)

(52) U.S. Cl. ............ 427/454; 427/8; 427/446; 427/456; 427/255.4

(58) Field of Classification Search .................... 427/454
See application file for complete search history.

(56) References Cited

U.S. PATENT DOCUMENTS

| | | | |
|---|---|---|---|
| 3,900,762 A | 8/1975 | Sheer et al. | |
| 4,613,259 A * | 9/1986 | Packer et al. | 406/14 |
| 4,726,962 A * | 2/1988 | Siemers et al. | 427/456 |
| 5,175,020 A | 12/1992 | Doellein et al. | |
| 5,262,245 A * | 11/1993 | Ulion et al. | 428/469 |
| 5,302,465 A | 4/1994 | Miller et al. | |
| 5,356,673 A | 10/1994 | Schmitt et al. | |
| 5,449,799 A | 9/1995 | Terfloth et al. | |
| 5,571,332 A | 11/1996 | Halpern | |
| 5,744,117 A | 4/1998 | Wilkinson et al. | |
| 5,853,815 A | 12/1998 | Muehlberger | |
| 6,042,898 A | 3/2000 | Burns et al. | |
| 6,258,467 B1 * | 7/2001 | Subramanian | 428/633 |
| 6,319,614 B1 | 11/2001 | Beele | |
| 6,348,237 B2 | 2/2002 | Kohler et al. | |
| 6,365,016 B1 | 4/2002 | Iacovangelo et al. | |
| 6,395,343 B1 * | 5/2002 | Strangman | 427/454 |

(Continued)

FOREIGN PATENT DOCUMENTS

CA    2 297 543 A1    2/2000

(Continued)

OTHER PUBLICATIONS

Definition of "to", www.merriam-webster.com, 3 pages, retrieved Mar. 3, 2011.*

(Continued)

*Primary Examiner* — Katherine A Bareford
(74) *Attorney, Agent, or Firm* — Kilpatrick Townsend & Stockton LLP

(57) ABSTRACT

Using this method, a coating (1) is manufactured on a substrate (2), which forms a surface of a base body. In this method a layer (3) with ceramic coating material is applied to the substrate in a process chamber (6) using a plasma beam (30) and using an LPPS or LPPS-TF process. The substrate contains at least one metal Me. At a set reaction temperature of the substrate and in the presence of oxygen, an oxide, which results reactively with metal M diffused on the surface, is generated as a ceramic intermediate layer (4). The ceramic layer (3) is deposited on this intermediate layer.

19 Claims, 2 Drawing Sheets

U.S. PATENT DOCUMENTS

| | | | |
|---|---|---|---|
| 6,565,672 B2 * | 5/2003 | Spitsberg et al. | 148/277 |
| 6,645,438 B1 | 11/2003 | Dubrovsky | |
| 6,740,624 B1 * | 5/2004 | Hoste et al. | 505/480 |
| 2002/0166231 A1 * | 11/2002 | Das et al. | 29/889 |
| 2003/0008167 A1 * | 1/2003 | Loch et al. | 428/632 |
| 2004/0038085 A1 * | 2/2004 | Litton et al. | 428/701 |
| 2004/0234687 A1 * | 11/2004 | Schmid et al. | 427/248.1 |
| 2006/0007366 A1 * | 1/2006 | Gotoh et al. | 349/42 |
| 2006/0251916 A1 * | 11/2006 | Arikawa et al. | 428/632 |
| 2007/0160859 A1 * | 7/2007 | Darolia et al. | 428/469 |

FOREIGN PATENT DOCUMENTS

| | | |
|---|---|---|
| EP | 1074637 A1 | 2/2001 |
| EP | 1479788 A1 | 11/2004 |
| JP | 01107442 A | 11/1990 |
| WO | WO 92/05298 A1 | 4/1992 |
| WO | WO 02/19455 | 3/2002 |
| WO | WO 02/45931 A1 | 6/2002 |

OTHER PUBLICATIONS

Oh, Seung-Min, et al., "Preparation of Ultra-fine Alumina Powders by D.C. Plasma Jet," *Korean J. Chem. Eng.*, 17(3), pp. 299-303 (2000).

Lehtinen, T., et al., "Correlations Between In-Flight Particle Concentrations and Coating Properties in Atmospheric Plasma Spraying of Alumina," Proceedings of the National Thermal Spray Conference, Tampere University, *ASM International*, Oct. 7, 1996, pp. 525-530.

* cited by examiner

METHOD FOR THE MANUFACTURE OF A COATING

CROSS-REFERENCE TO RELATED APPLICATIONS

This application claims the priority of European Patent Application No. 06405192.3, dated May 5, 2006, the disclosure of which is incorporated herein by reference.

BACKGROUND OF THE INVENTION

The invention relates to a method for the manufacture of a coating and also to a body coated with this method.

Large areas can be uniformly provided with thin layers using a special LPPS process ("Low pressure plasma spraying process"), namely using a LPPS-TF process ("LPPS—thin film process") which is known from U.S. Pat. No. 5,853,815. This process is a thermal low pressure spraying method with which layer thicknesses in the micrometer range can be produced. The manufacture of a uniform coating is attained by means of a spraying gun, which is geometrically suitably designed, with it also being essential that a sufficiently large overpressure prevails in the spraying gun. The surface to be coated is brought into a process chamber, in which a pressure lower than 10 kPa is generated, while in the spray gun for example there is a pressure of approximately 100 kPa, in other words approximately environmental pressure prevails. The large pressure difference between the inside of the spray gun and the process chamber has the effect that the thermal process beam expands to a broad beam in which the material to be sprayed is uniformly distributed. A thin layer is deposited which is dense due to the homogeneous process beam. A thicker coating with special characteristics can be intentionally produced by means of multiple application of layers of this kind.

A coating of this kind can be used as a functional layer. A functional layer can be applied to a metallic base body, which forms the substrate to be coated, and is as a rule a multiple layer system with differently composed part layers. For example, the blades for gas turbines (stationary gas turbines or aircraft engines) which are operated at high process temperatures are coated with a first part layer comprising a single layer or a multiple layer, so that the substrate becomes resistant to hot gas corrosion. A second part layer—of ceramic material—forms a heat insulating layer. A method for the production of such a heat insulating layer system is described in EP-A-1 260 602, with which a plurality of layers (barrier layer, protection layer, heat insulating layer, smoothing layer) are applied in one working cycle by means of a changing setting of controllable process parameters.

In a special LPPS-TF process, a hybrid coating is carried out with the thermal process beam. This process, which is known from EP-A-1 034 843 or EP-A-1 479 788, permits the combination of thermal spraying with a vapour phase deposition and thus possibilities of combining the two methods. The characteristics of the process beam are determined by controllable process parameters, in particular by the parameters pressure, enthalpy, composition of a process gas mixture and composition and also the application form of the material to be sprayed. The coating material is partly vaporised in dependence on the controllable parameters. The phases of the coating material present in vapour form and condensed form, i.e. in solid or fluid form, are at least partly deposited on the substrate. The relative proportion of vapour and/or condensed phase for the material transported in the process beam is determined by means of a diagnostic measuring method. The controllable process parameters are adjusted in relation to desired values using measuring data gained in this way. With regard to these desired values, which correspond to a specified proportion of vapour or proportion of the condensed phase, a regulation of the intentional manufacture of the multiple layer system is carried out.

Using the hybrid coating method a heat insulating layer can be manufactured with a columnar microstructure. This deposit or layer is composed approximately of cylindrical particles or corpuscles, the central axes of which are directed perpendicular to the substrate surface. Transition regions, in which the density of the deposited material is smaller than in the corpuscles, bound the corpuscles at the side. This columnar layer with anisotropic microstructure is tolerant to elongation with respect to changing stresses, which result due to repeatedly occurring temperature changes. The coating reacts to the changing stresses in a largely reversible manner, i.e. without a formation of cracks, so that its natural life is increased considerably in comparison with the natural life of a coating which has no columnar microstructure.

SUMMARY OF THE INVENTION

It is an object of the present invention to provide a method for the manufacture of a coating on a substrate with the coating composed of a ceramic, multi-layered functional layer and with an improved transition between the substrate and the coating in comparison to known functional layers. In this connection, ceramic coating material is to be applied to the substrate with a LPPS and/or LPPS-TF process as a functional layer, which includes a columnar part layer in particular. This object is satisfied by the methods disclosed herein.

With the method a coating is manufactured on a substrate, which forms a surface of a base body. The substrate is in particular a bond layer. A layer with ceramic coating material is applied to the substrate in a process chamber using a plasma beam and utilising an LPPS or LPPS-TF process. The substrate contains at least one metal Me. At an adjusted reaction temperature of the substrate and in the presence of reactive oxygen, an oxide which results reactively with metal Me diffused onto the surface is produced as a ceramic intermediate layer. The ceramic layer is deposited on this intermediate layer.

Other advantageous embodiments of the method in accordance with the invention are disclosed. A body coated using this method is also disclosed.

BRIEF DESCRIPTION OF THE DRAWINGS

The invention will be explained in the following with the help of the drawings, which show.

DESCRIPTION OF THE PREFERRED EMBODIMENTS

Figure 1:
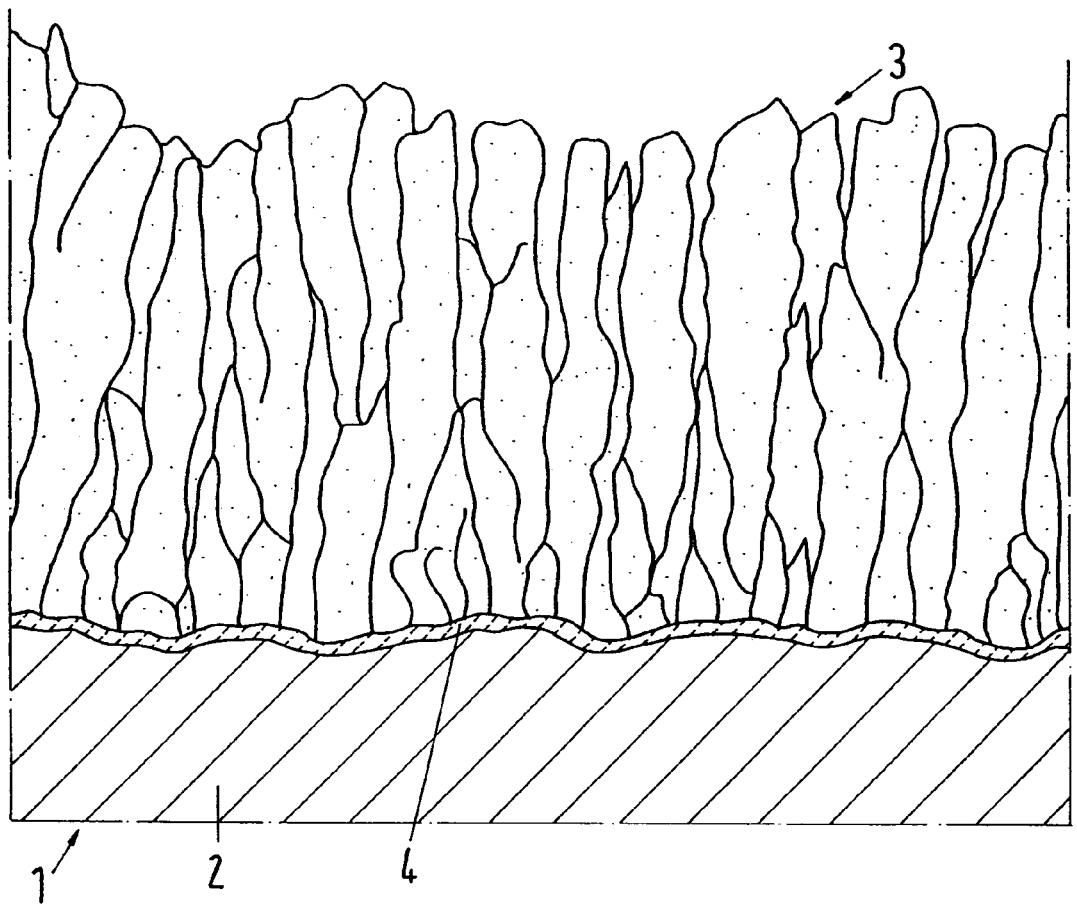
FIG. 1 is a section of a coating, which is manufactured using the method in accordance with the invention.
Figure 2:
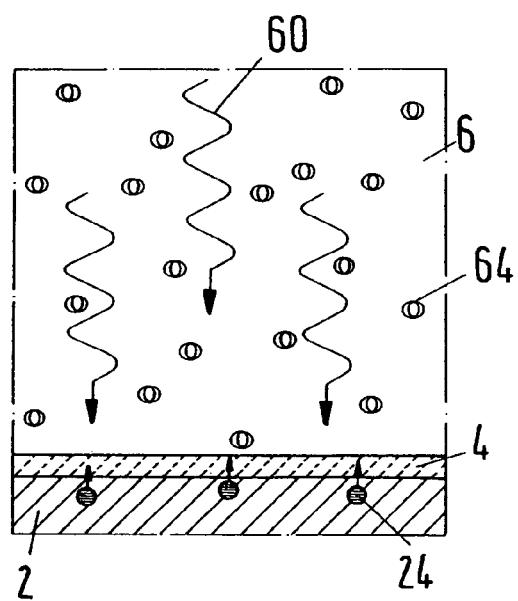
FIG. 2 is a schematic illustration relating to the manufacture of a thin ceramic intermediate layer.

A functional layer, namely a coating 1, as is illustrated in FIG. 1 in section, includes, on a substrate 2, a layer 3 made of ceramic coating material and a ceramic intermediate layer 4, which is manufactured in accordance with the invention using the method illustrated schematically in FIG. 2. The substrate 2 is located on the surface of a not illustrated base body.

The coating method in accordance with the invention was developed for a functional layer which included a columnar layer 3, wherein this columnar layer 3 was to be applied to a special substrate 2, which contains a metal Me which can be oxidised under suitable reaction conditions. The suitable reaction conditions include a reaction temperature, at which the metal Me diffuses to the surface of the substrate 2, where it can be oxidised. One finds, in retrospect, that this method can be applied more generally, namely also on ceramic functional layers whose layer 3 has no columnar structure.

The substrate 2 is the surface of the base body; or it is a bond layer, which is applied on the base body. In the example illustrated in FIG. 1, a ceramic layer 3 which is columnar but which could also be non-columnar is applied onto the substrate 2. A LPPS-TF process is used in the manufacture of the coating 1, with a plurality of uniform and thin layers being applied to the base body in a process chamber 6 (see also FIG. 3) and using a plasma beam 30. The columnar layer 3 is applied using the hybrid method in which vaporous and condensed phases of a ceramic coating material are sprayed on. Prior to the application of the columnar layer 3, which comprises ceramic material, the ceramic intermediate layer 4 is manufactured as a TGO layer (thermal grown oxide) on the substrate 2, see FIG. 2. The use of a LPPS process instead of the LPPS TF process or in combination with this is also possible.

The substrate 2 contains at least the metal Me, to which the reference numeral 24 is assigned in FIG. 2. In the formation of the TGO layer, oxygen $O_2$—symbolised by particle 64—reacts with the metal Me or also with a plurality of metals. The oxygen 64 is present in the process chamber 6 with a predetermined partial pressure. This is in the range of 0.01 mbar to 20 mbar, depending on the working pressure in the process chamber 6, with the maintenance of a defined value being controlled by mass flow regulators for example. The $O_2$ partial pressure influences the growth speed and structure in the formation of the TGO layer in this arrangement. In order for this oxidation to arise, the substrate 2 has to be brought to the above-named reaction temperature by means of an energy input, for example by irradiation with infrared, which is symbolised by waves 60. Metal 24 diffuses at the reaction temperature of the substrate 2 to its surface and also to the surface of the intermediate layer 4 which is forming. This layer 4 represents a suitable foundation for the layer 3 which is subsequently to be deposited because it establishes a transition from a metallic material to a ceramic material. The ceramic intermediate layer 4 has a thickness the value of which is in the range of 0.001-2 μm, in particular 0.1-0.6 μm.

The reaction temperature of the substrate 2 necessary for the oxidation depends on its composition. It can be produced by means of an energy input by the plasma beam or by an additional source. The additional source can be arranged inside the process chamber 6 or outside this in a transfer chamber. This source is, in particular, an infrared heater, a laser or an electron beam generator.

The metal Me is advantageously aluminium Al; however, further metals can also be involved in the formation of the ceramic intermediate layer 4. The reaction temperature of the substrate 2 has, in particular, a value in the range of 900-1150° C. This range can also be greater and can, for example, lie between 800° C. and 1200° C.

The substrate 2 comprises a metallic alloy, in particular a material from the group of the MCrAlY alloys, with M=Ni, Co, CoNi or Fe. It can also comprise an aluminide, for example PtAl or PtNiAl, or an intermetallic phase, for example an NiAl compound.

The reaction temperature of the substrate 2 is measured, using at least one sensor and set. In this arrangement the sensor can be an infrared pyrometer, a thermal camera or a thermal sensor.

If the substrate 2 is a bond layer, then after the manufacture of the bond layer, the base body to be coated can be introduced into the process chamber 6. The base body is however advantageously first coated with the bond layer in the process chamber 6 by means of the LPPS process, the LPPS-TF process or a PVD method. At the beginning of the coating method the surface of the base body can be cleaned with the plasma beam or a different energy inputting means, for example by a transferred arc from the plasma beam source ("transferred arc cleaning").

Figure 3:
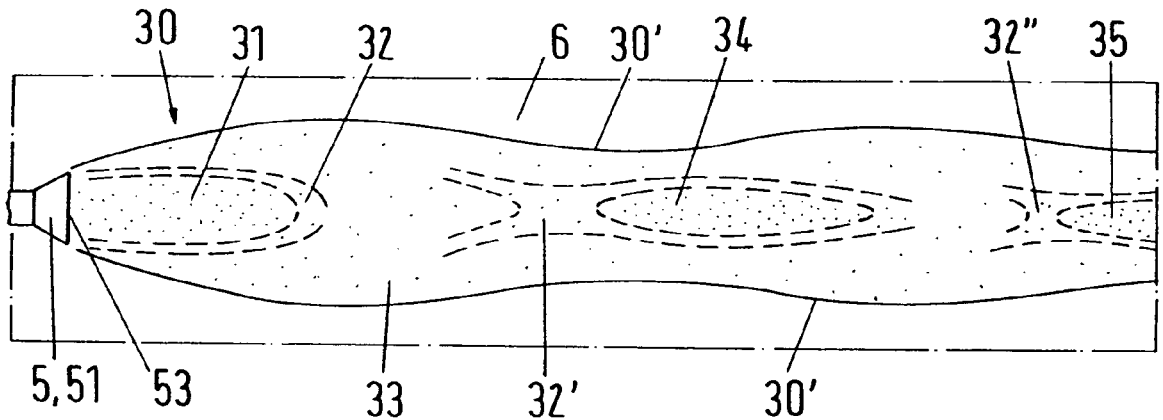
FIG. 3 is the side view of a process beam, which is drawn in accordance with a photographic image, wherein individual regions are illustrated with broken lines.
Figure 4:
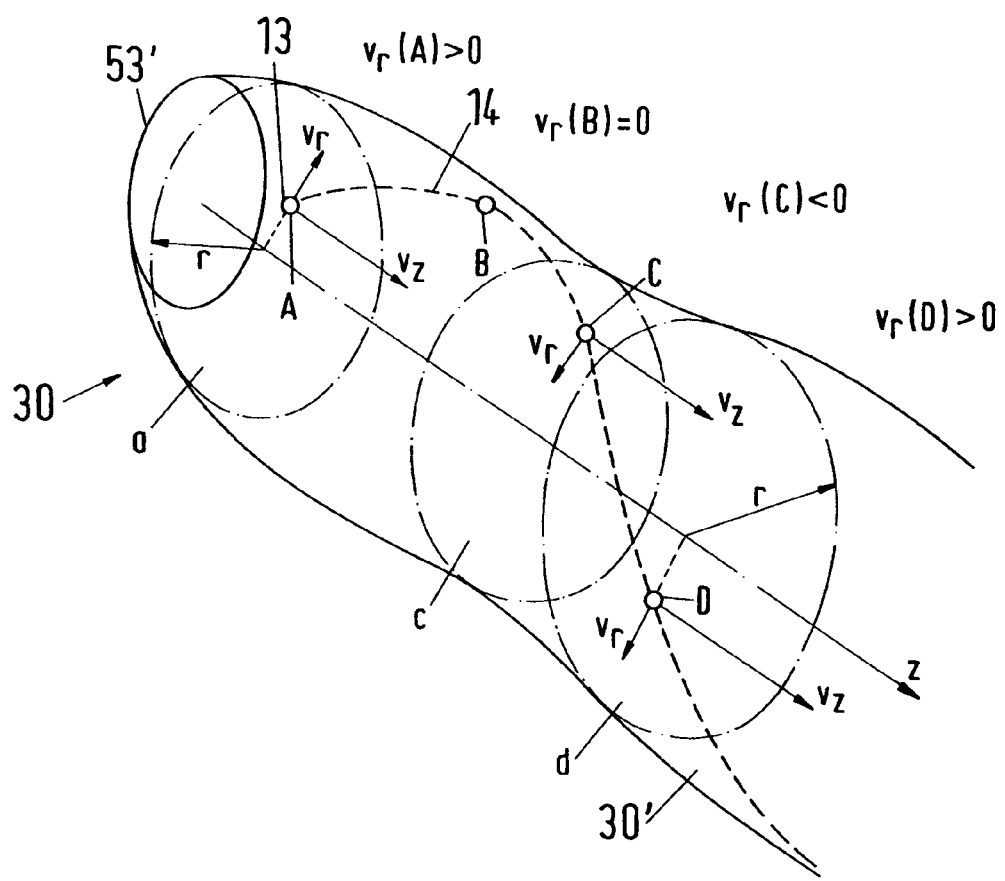
FIG. 4 is a schematic perspective view of the process beam of FIG. 3.

FIG. 3 shows the side view of a process beam 30, which is drawn in accordance with a photographic image; it flows out of a nozzle 51 of a spray gun 5. Vapour of the coating material and particles, which scatter and/or emit light, make the process beam 30 visible. One recognises in particular—even if weaker than shown—an outer surface 30', which forms a boundary with respect to the remaining space of the process chamber 6. Periodically occurring core regions 31, 34 and 35 can be recognised inside the beam 30, in which the density of the material to be sprayed is greater than in a contiguous region 33 which borders on the surface 30'. Between the core regions 31, 34 and 35 and the region 33 there are transition regions 32, 32', 32" with average densities. The process beam 30 spreads out ultrasonically with shock waves forming. At the outlet 53 of the nozzle 51 the pressure is greater than in the atmosphere of the process chamber 6 outside of the process beam 30. A wave-shaped surface 30' results from an interaction between the surrounding atmosphere and the process beam 30. This interaction also has the result that in hybrid coating methods the vaporous proportion of the material to be coated remains trapped inside the surface 30'. This will be explained more closely with the help of FIG. 4.

A ring 53' marks the beginning of the process beam 30 at the nozzle output 53. Three cross-sections a, c and d of the process beam 30, which flows in the direction of the z-axis, are shown with chain-dotted rings. The circular cross-section of the process beam 30 has a variable radius r. At a first point in time, a vapour particle (atom or molecule) is located at a position A marked by a small circle in cross-section a and moves further on a curve 14 through a position B at the beam surface 30', through a position C at the cross-section c and through a position D at the cross-section d. This vapour particle has a longitudinal speed component $v_z$ in the flow direction (ultrasonic) and a transversal or radial component $v_r$, which is smaller than $v_z$. In the position A, $v_r=v_r$ (A)>0. Through the interaction with the gas from the environment 6, the $v_r$ reduces until this speed component in the position B changes direction. In position C, $v_r<0$ and the vapour particle approaches the z-axis. After a transit through the middle of the process beam 30 $v_r>0$ is valid again at the position D. Through the interaction with the environment 6, the vapour particle thus makes a wave motion within the boundary surface 30' of the process beam 30. This largely applies for all vapour particles. The vaporised coating material remains held behind in the process beam 30 with the surface 30' appearing as a barrier. The vaporous phase can make its contribution to the composition of the columnar layer, since it does not leave the process beam.

The formation of the columnar layer 3 likewise advantageously takes place by regulation of a defined $O_2$ partial pressure in order to guarantee an adequate saturation of the layer with $O_2$, since this not only influences the stoichiometric composition but also the growth and the structure of the columnar layer 3. In this connection the working pressure in the process chamber 6 is in the range of 0.01-20 mbar, preferably 0.05-5 mbar, and the $O_2$ partial pressure is in the range of 0.01-2 mbar, preferably 0.05-1 mbar.

A typical embodiment will be described in the following:

A metallic bond layer of PtAl (with an EB-PVD method) or of MCrAlY (with an LPPS method) is applied on to a component (base body), wherein the roughness of this coating should have a value less than 1 to 2 µm.

In the process chamber 6 the component is heated up to the start temperature (in the range of 900° C. to 1150° C.) by means of the plasma beam of the LPPS method (process gas Ar with an addition of $H_2$ or He) at a pressure of the surrounding atmosphere of approximately 100 mbar.

A TGO layer of approximately 0.1-0.5 µm thickness forms with the addition of $O_2$ to the environmental gas with a partial pressure in the range of 0.05-5 mbar during approximately 10-15 minutes. In this arrangement, the component is held at the working temperature by means of a process plasma beam. The temperature and the $O_2$ partial pressure are kept at constant values in a controlled manner in this arrangement.

A columnar layer (TBC, "thermal barrier coating")—layer 3—with a thickness of approximately 100 to 200 µm is then applied onto the component by means of the LPPS-TF process at approximately 0.5-5 bar (in accordance with EP-A-1 034 843), wherein the $O_2$ partial pressure of approximately 0.05-0.5 mbar is maintained and monitored during the entire coating process.

The coated component is finally cooled in a separate lock chamber and protected by an Ar atmosphere.

A body which is manufactured from a metallic material can be coated using the method in accordance with the invention. The coating 1 of such a body has a thickness of the ceramic intermediate layer 4 which is between 0.001-2 µm. This thickness is advantageously between 0.1-0.6 µm. The ceramic intermediate layer 4 can be homogeneously formed over a height of greater than 0.05 µm.

The ceramic layer 3 applied onto the ceramic intermediate layer 4 is, for example, formed in accordance with one of the following alternatives:

a) The layer 3 has a non-columnar structure thermally sprayed on by means of the LPPS-TF process.

b) A thin columnar part layer becomes a non-columnar part layer in the layer 3.

c) The layer 3 consists of a multiple layer structure which includes a combination of columnar and non-columnar part layers and which includes in particular alternately a thin columnar part layer, a non-columnar part layer and at least one further layer with a columnar structure.

In a further embodiment the ceramic layer 3 includes a combination of two metal oxides, which form two columnar part layers. The first metal oxide is in particular a part stabilised zirconium oxide and the second metal oxide is, for example, zirconium oxide which is fully stabilised with dysprosium. The second metal oxide can also be a lanthanum zirconate or an $A_2E_2O_7$ pyrochlorine, wherein A is preferably an element of the lanthanum series, in particular gadolinium, and E is zirconium. The metal oxides can have a perovskite phase or a spinel phase. The ceramic layer 3 can also be formed from a multiple application of the combination of the two metal oxides.

The invention claimed is:

1. A method for the manufacture of a coating on a substrate, which is located on the surface of a base body, in said method a ceramic layer with ceramic coating material being applied to the substrate in a process chamber using a plasma beam and using a low pressure plasma spraying thin film (LPPS-TF) process, wherein the substrate contains at least one metal which at an adjusted reaction temperature of the substrate diffuses to a surface of the substrate, and in the presence of reactive oxygen oxidizes to produce a ceramic intermediate layer having a thickness between 0.001 and 2 µm, the ceramic layer being deposited on the ceramic intermediate layer, wherein the reaction temperature of the substrate has a value in the range from 800° C.-1200° C., and wherein an oxygen partial pressure value in the range of 0.05-5 mbar is regulated in the process chamber for production of the ceramic intermediate layer and wherein the oxygen partial pressure value is subsequently regulated in the range of 0.01-2 mbar in the process chamber for production of the ceramic layer, wherein the at least one metal of the substrate diffuses to a surface of the ceramic intermediate layer during production of the ceramic intermediate layer.

2. A method in accordance with claim 1, wherein the substrate is the surface of the base body or a bond layer applied to the base body, and wherein the reaction temperature of the substrate, which depends on its composition, is produced by an energy input applied by an additional source.

3. A method in accordance with claim 2, wherein the additional source is arranged inside the process chamber or in a transfer chamber, and wherein this source is an infrared heater, a laser, or an electron beam generator.

4. A method in accordance with claim 3, wherein the source is an infrared heater.

5. A method in accordance with claim 2, wherein the substrate is a bond layer, and wherein the base body is introduced into the process chamber after manufacture of the bond layer or wherein the bond layer is deposited on the base body by the LPPS-TF process.

6. A method in accordance with claim 1, wherein the reaction temperature of the substrate has a value in a range of 900° C.-1150° C., and wherein the metal is at least partly aluminum Al, and wherein the ceramic intermediate layer comprises $\alpha$-$Al_2O_3$ up to more than 90%.

7. A method in accordance with claim 1, wherein the ceramic layer is or includes a columnar part layer, which is sprayed on with the LPPS-TF process by application of a plurality of uniform and thin layers onto the substrate.

8. A method in accordance with claim 7, wherein the LPPS-TF process comprises a hybrid method in which the vaporous and condensed phases of the ceramic coating materials are applied.

9. A method in accordance with claim 1, wherein the substrate is made of a material from the group of the MCrAlY alloys, with M=Ni, Co, CoNi or Fe, or PtAl or PtNiAl, or an NiAl compound.

10. A method in accordance with claim 1, wherein the reaction temperature of the substrate is measured and adjusted using at least one sensor, and wherein the sensor is an infrared pyrometer, a thermal camera or a thermal sensor.

11. A method in accordance with claim 1, wherein the surface of the base body is cleaned with the plasma beam or with another energy input.

12. A method in accordance with claim 1, wherein the plasma beam heats the substrate to the adjusted reaction temperature for 10-15 minutes to produce the ceramic intermediate layer.

13. A method in accordance with claim 1, wherein the ceramic layer comprises a combination of a first and a second metal oxide.

14. A method in accordance with claim 13, wherein the first metal oxide is a partially stabilized zirconium oxide and the second metal oxide is a zirconium oxide which is fully stabilized with dysprosium, or an $A_2E_2O_7$ pyrochlorine, where A is an element of the lanthanum series and E is zirconium.

15. A method in accordance with claim 1, wherein the substrate is the surface of the base body or a bond layer applied to the base body, and wherein the reaction temperature of the substrate, which depends on its composition, is produced by the plasma beam.

16. A method in accordance with claim 1, wherein oxygen is introduced into the chamber after the substrate has been heated to the adjusted reaction temperature.

17. A method in accordance with claim 16, wherein the ceramic intermediate layer forms with the introduction of the oxygen into the chamber over a period of approximately 10-15 minutes.

18. A method for the manufacture of a coating on a substrate, which is located on the surface of a base body, in said method a ceramic layer with ceramic coating material being applied to the substrate in a process chamber using a plasma beam and using a low pressure plasma spraying thin film (LPPS-TF) process, wherein the substrate contains at least one metal which at an adjusted reaction temperature and in the presence of reactive oxygen oxidizes to produce a ceramic intermediate layer having a thickness between 0.001 and 2 µm, the ceramic layer being deposited on the ceramic intermediate layer, wherein the reaction temperature of the substrate has a value in the range from 800° C.-1200° C., and wherein an oxygen partial pressure value in the range of 0.05-5 mbar is regulated in the process chamber for production of both the ceramic intermediate layer and wherein the oxygen partial pressure value is subsequently regulated in the range of 0.01-2 mbar in the process chamber for production of the ceramic layer, wherein the substrate is the surface of the base body or a bond layer applied to the base body, and wherein the reaction temperature of the substrate, which depends on its composition, is produced by an energy input of the plasma beam, wherein the substrate is made of a material from the group of the MCrAlY alloys, with M=Ni, Co, CoNi or Fe, or PtAl or PtNiAl, or an NiAl compound, wherein the ceramic layer comprises at least one columnar layer having a thickness ranging from 100 to 200 µm, wherein the at least one metal of the substrate diffuses to a surface of the ceramic intermediate layer during production of the ceramic intermediate layer.

19. A method in accordance with claim 18, wherein the substrate is a bond layer, and wherein the bond layer is deposited on the base body using the LPPS-TF process in the process chamber.

* * * * *